United States Patent

[11] 3,534,656

[72] Inventor Anatol Michelson
Glenolden, Pennsylvania
[21] Appl. No. 756,246
[22] Filed Aug. 29, 1968
Continuation-in-part of Ser. No. 680,812
Nov. 6, 1967, now Patent No. 3,492,918.
[45] Patented Oct. 20, 1970
[73] Assignee by mesne assignments to Gulf & Western
Industrial Products Company
Grand Rapids, Michigan
a corporation of Delaware

[54] CUTTING MACHINE
8 Claims, 14 Drawing Figs.
[52] U.S. Cl..................................................... 90/11,
90/18, 83/564, 164/263
[51] Int. Cl..................................................... B23c 1/12,
B22d 11/12

[50] Field of Search............................................ 90/11, 11.2,
18, 17, 24.04, 24.06; 51/99; 83/482, 564; 143/46,
41, 41—2, 41—5, 35, 1; 164/263, 69

[56] References Cited
UNITED STATES PATENTS
2,312,355 3/1943 Oberhoffkin.................. 90/11
2,393,213 1/1946 Willard......................... 164/263
3,191,500 6/1965 Schuster....................... 90/11

*Primary Examiner*—Gil Weidenfeld
*Attorney*—Meyer, Tilberry and Body

ABSTRACT: An improved rotary cutting apparatus for removing the corners from an elongated workpiece of polygonal cross section. The apparatus includes a power actuated frame for selectively swinging the cutting assemblage and its drive about an axis parallel with the cutting assemblages axis of rotation between a working position and a position spaced therefrom.

Patented Oct. 20, 1970

INVENTOR.
ANATOL MICHELSON
BY
Meyer, Tilberry & Body
ATTORNEYS.

INVENTOR.
ANATOL MICHELSON
BY
Meyer, Tilberry & Body
ATTORNEYS.

Patented Oct. 20, 1970

INVENTOR.
ANATOL MICHELSON
BY
Meyer, Tilberry & Body
ATTORNEYS.

INVENTOR.
ANATOL MICHELSON
BY
Meyer, Tilberry & Body
ATTORNEYS.

INVENTOR.
ANATOL MICHELSON
BY
Meyer, Tilberry & Body
ATTORNEYS

CUTTING MACHINE

This application is a continuation-in-part of my previously filed, copending U.S. Pat. application Ser. No. 680,812, filed November 6, 1967 now U.S. Pat. No. 3,492,918.

The present invention is directed toward the cutting art and, more particularly, to an improved apparatus for removing the longitudinally extending corners of an elongated workpiece.

The invention is especially suited for conditioning the corners of cast steel strands or billets coming from a continuous casting machine and will be described with particular reference thereto; however, it is appreciated the invention is capable of broader application and could be used in other environments and for removing the corners of elongated member formed from a variety of materials.

As is well known, the corners of cast billets, particularly continuously cast steel billets, contain microcracks. During subsequent rolling of the billets to the desired configuration, the microcracks cause the formation of larger cracks in the products. Consequently, to avoid this problem, the corners of the billet are conditioned by removing a portion sufficient to eliminate the microcracks.

In the past, several different approaches have been used for corner conditioning. Among these are milling, scarfing, and abrasive grinding. All of these methods however, have a number of substantial disadvantages and shortcomings. For example, conventional milling is not practical because it is too slow in terms of feet per minute of corner machined. Additionally, in order to condition all four corners of a standard rectangular billet simultaneously, the equipment required is bulky and costly. Scarfing is likewise not completely satisfactory because the depth of corner removed cannot be closely controlled. Further, the residual melted metal adversely affects the properties of the resultant rolled product.

Of the prior methods, the most commonly used is abrasive grinding. This method produces properly conditioned corners but has a number of distinct drawbacks. First, the service life of the grinding wheels is extremely short. This necessitates frequent wheel replacement which results in high costs both in machine downtime and grinding wheels. Second, the grinding wheels must be mounted with their axis of rotation parallel to the corners of the casting. Thus, the number of spindle-motor drive units must be equal to the number of corners being conditioned. This produces an expensive, space consuming apparatus. And, thirdly, the metal removed is in the form of powder mixed with abrasive dust. This makes metal recovery very difficult and expensive.

The present invention provides an improved apparatus for conditioning the corners of a cast metal strand or billet which overcomes the above-mentioned problems. By use of the subject apparatus the amount of corner material removed can be closely controlled. Additionally, two corners can be conditioned by one unit comprising one cutter heat shaft and one drive; thus, reducing the equipment and space required and producing economies in both construction and operation. Further, any shifting of the billet, either because of distortion under thermal stresses or otherwise, is compensated for automatically without special controls or readjustment of the mechanism. Still further, recovery of the metal removed can be easily accomplished.

In accordance with one aspect of the invention described and claimed in my prior application, Ser. No. 680,812 filed Nov. 6, 1967, apparatus is provided for removing a pair of adjacent corners from an elongated workpiece of polygonal cross section. The apparatus comprises:

a. a circular cutting tool assemblage including first and second cutting members in the form of truncated circular cones with their outer conical surfaces defining cutting bands;
b. spindle means for mounting the cutting member for rotation about an axis with their smaller diameter ends in opposed relationship;
c. means for rotating the cutting member; and,
d. first means for maintaining the cutting members under a predetermined constant bias in a first direction generally perpendicular to said axis of rotation.

In accordance with a more limited aspect of the said invention, the apparatus includes second means for permitting the cutting members to have freedom of movement in two directions generally along their axis of rotation.

By permitting the cutting tool to have limited freedom of movement in two directions along its axis of rotation, and arranging the cutting bands in the manner described, the cutting tool will automatically shift to follow transverse movement of the workpiece in these two directions. Additionally, because the tool is under a continuous bias toward the workpiece it also follows any shifting in directions transverse to the first two directions.

This prior claimed invention is especially suited for use in continuous casting installations for removing the corners from a plurality of closely spaced, continuously cast strands. This is so because machines formed according to the invention can be made sufficiently narrow to permit separate, simultaneously operable machines to be provided for each strand. One drawback however is that certain difficulties are experienced in servicing the cutting head assemblies when a substantial number of the machines are side-by-side as is required by a multiple strand casting installation.

As can be appreciated, because of the heat radiated by the hot strands, in order to service the cutting head assemblages casting must be discontinued or the assemblages moved a substantial distance from the strands. Because of the economics of the situation, to stop casting is out of the question. Therefor, it must be possible to readily move the assemblage away from the strand to a location wherein workmen can perform the required servicing. Additionally, it should preferably be possible to accomplish this without disturbing the operation of adjacent conditioning machines or in any way interrupting casting.

In accordance with the present invention the above is achieved by providing power actuated frame means for swinging the cutting tool assemblage and spindle means about an axis spaced a substantial distance from the cutting periphery in a direction outwardly of the cutting position. This allows the cutting tool assemblage to, for example, be moved away from the strand a distance equal to twice the distance between the axis and the cutting position. Additionally, by positioning the axis horizontally, the swinging movement will be in a vertical plane and adjacent machines will not be disturbed.

Accordingly, a primary object of the invention is the provision of improved apparatus especially suited for use in removing the corners of continuously cast metal strands.

A further object is the provision of a corner conditioning machine which is adapted for use in multiple strand continuous casting installations.

Another object is the provision of cutting apparatus of the type described wherein the cutting assemblage can be readily serviced without discontinuing the casting operation.

Still another object is the provision of cutting apparatus of the type heretofore discussed wherein the cutting assemblage can be rotated about an axis spaced a substantial distance from the cutting position.

These and other objects and advantages will become apparent from the following description when read in conjunction with the accompanying drawings which illustrate a preferred embodiment of the invention and wherein.

Figure 11:
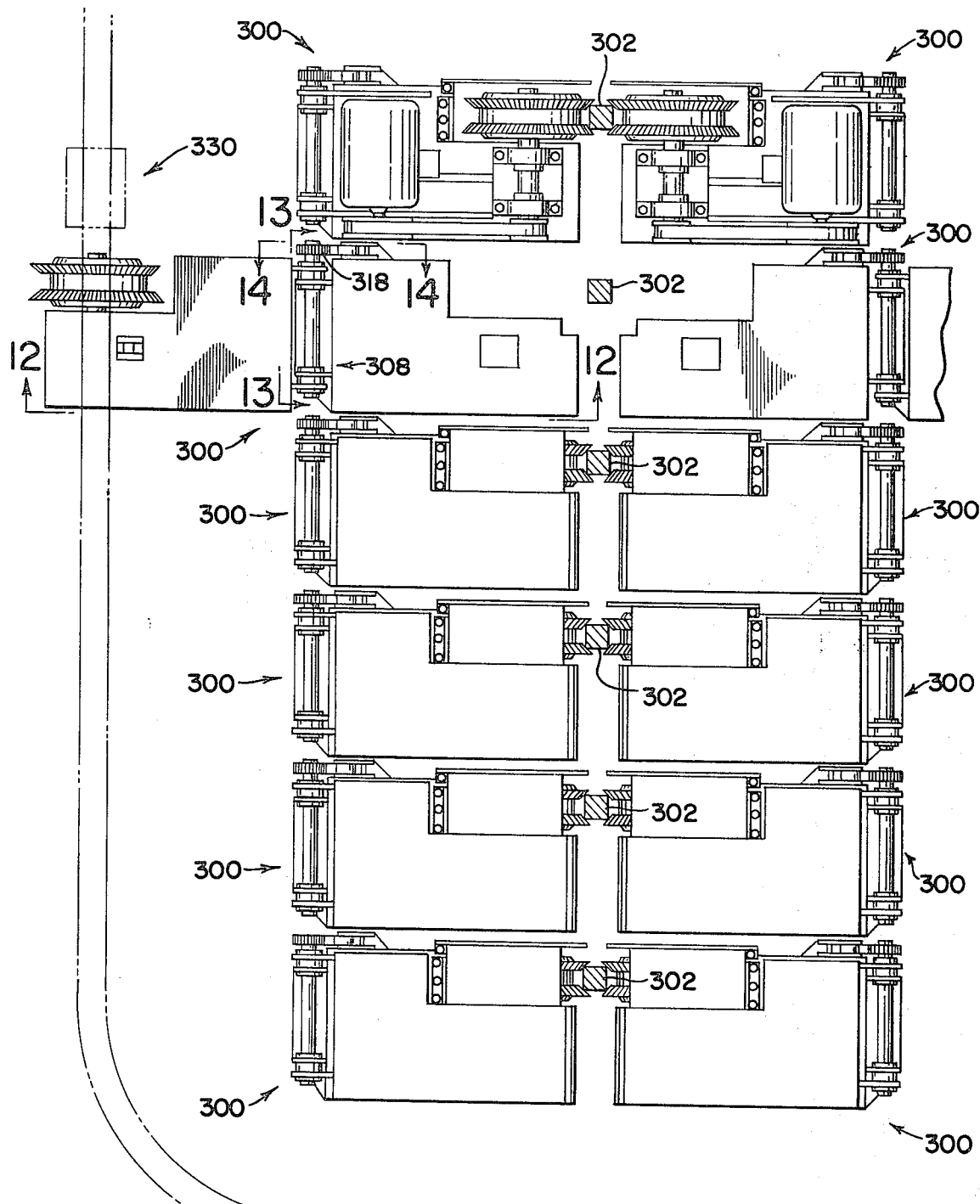
FIG. 11 is a plan view of a multiple strand continuous casting installation provided with corner conditioning machines adapted for easy blade or cutting assemblage servicing.
Figure 12:
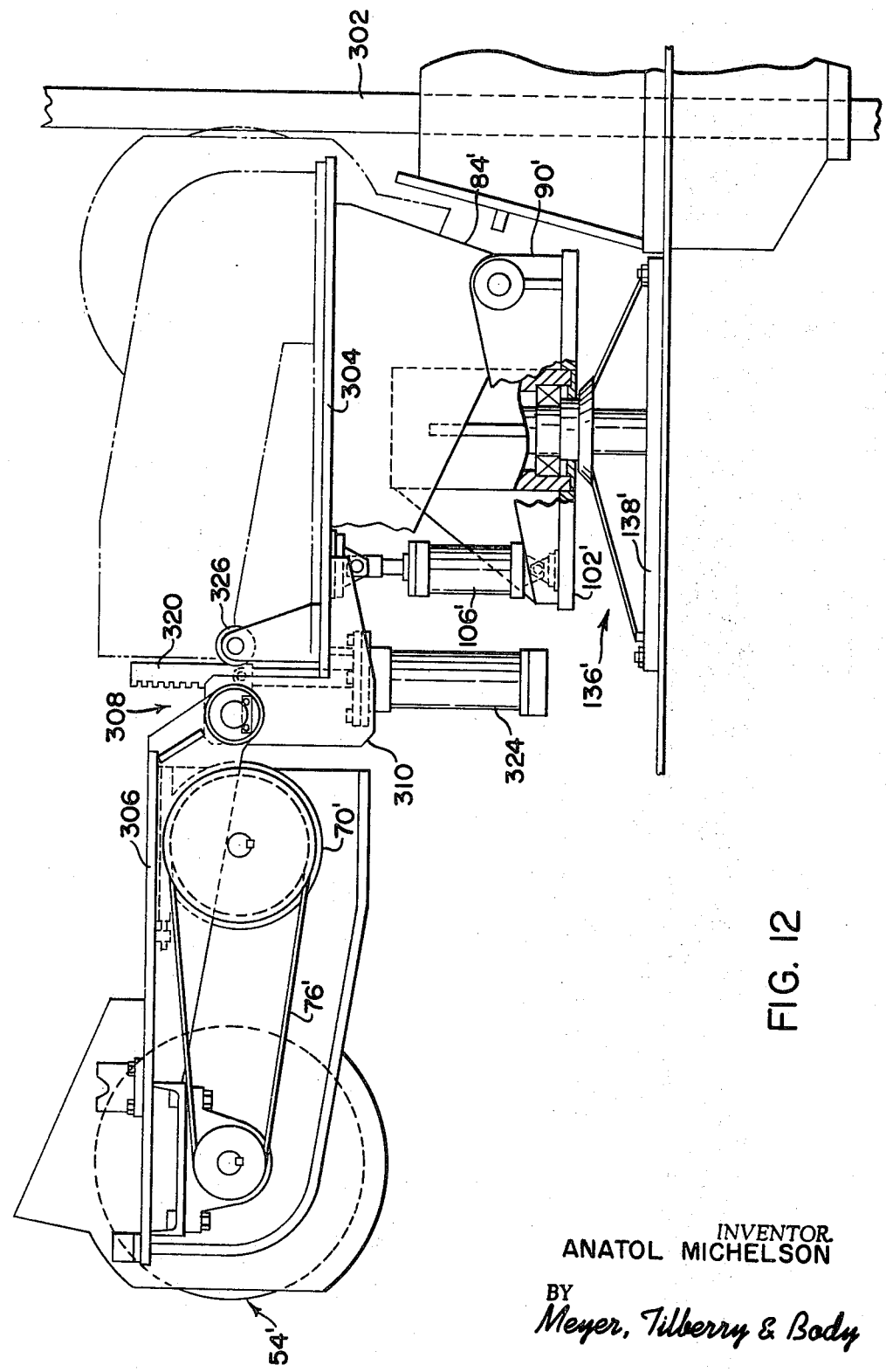
Figure 13:
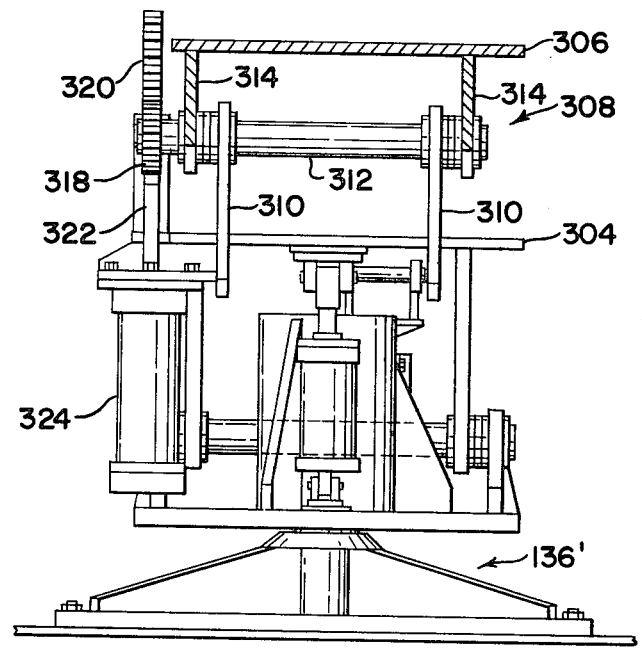
Figure 14:
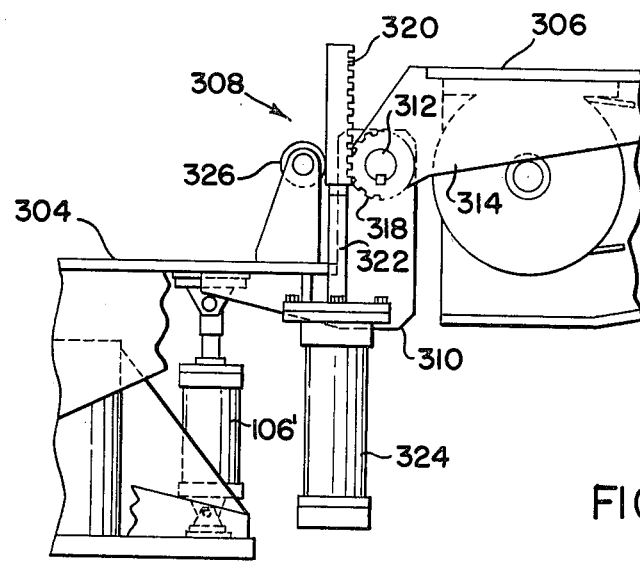

FIG. 12 is a view taken on line 12–12 of FIG. 11 and showing a modified form of the corner conditioning machine which is especially suited for use in multiple strand continuous casting installations; and FIGS. 13 and 14 are cross section views taken on lines 13–13 and 14–14, respectively of FIG. 12.

Figure 6:
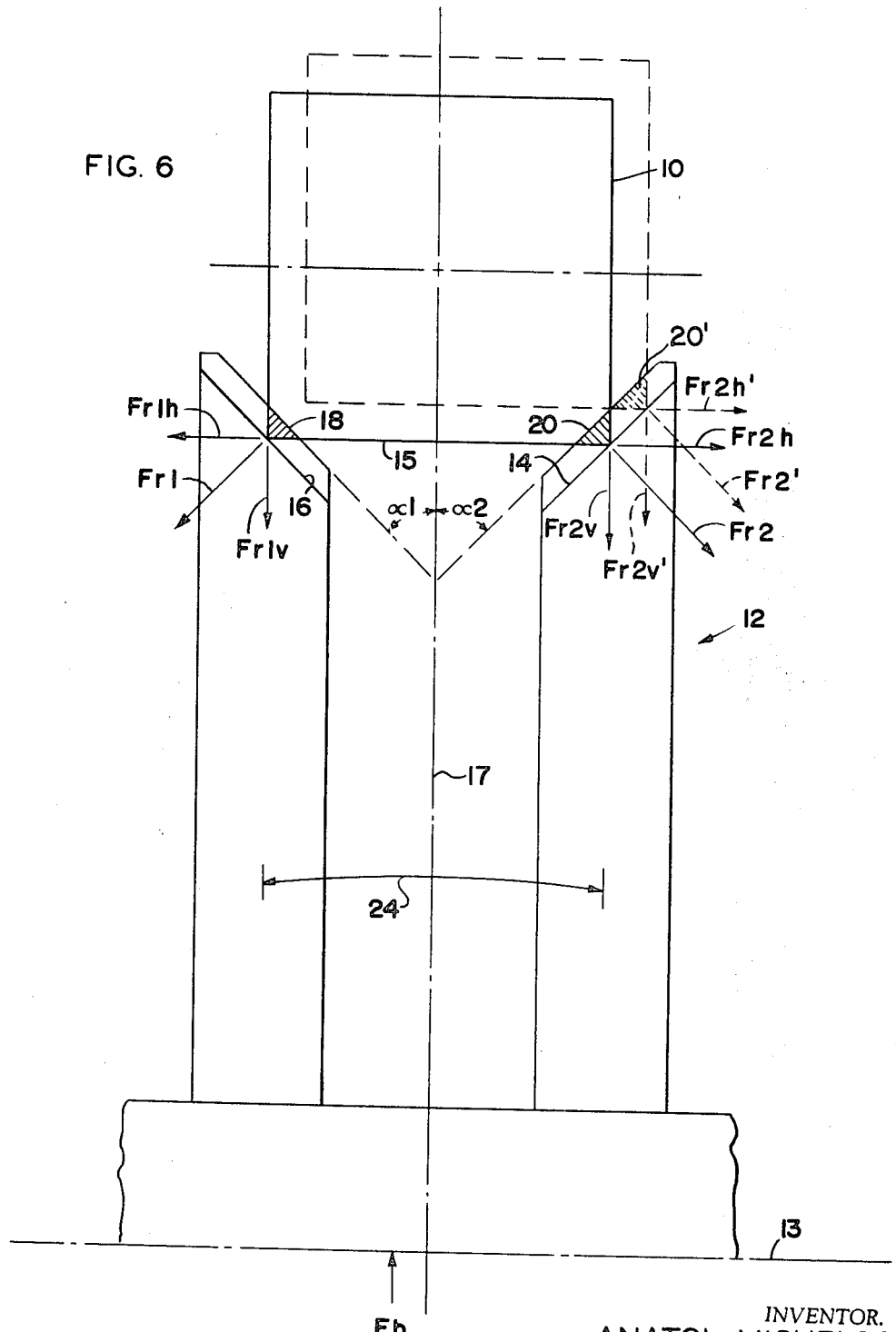
FIG. 6 is an enlarged diagrammatic plan view showing the force and movement relationships between the cutting tool and the billet during the cutting operation.

Referring specifically to the drawings wherein the showings are for the purpose of illustrating the preferred embodiment of the apparatus only, and not for the purpose of limiting same, FIG. 6 shows, in a somewhat diagrammatic view, a cutting tool of the preferred type being used to trim the corners from a billet of rectangular cross section coming from a continuous casting machine. The billet 10 is shown as moving vertically downwardly (into the drawing as viewed in FIG. 6). As previously discussed, the corners of the billet must be conditioned prior to subsequent rolling operations. For this purpose, a circular rotary cutting tool assemblage 12 is positioned with its axis of rotation 13 lying in a plane generally perpendicular to the path of movement of the billet 10. In the case where the billet is of rectangular cross section, the axis 13 is also preferably parallel with the normal position of one of the faces of the billet. In the FIG. 6 illustration, the axis 13 would preferably be parallel with face 15 of the billet.

As shown, the outer cutting periphery of the cutting tool assemblage 12 is of special configuration. As can be seen, the periphery is in the form of two circumferentially extending peripheral bands 14 and 16 which are inclined at angles $X_1$ and $X_2$ relative to the plane of rotation 17 of the cutting tool (e.g. the bands are defined by two members in the form of truncated cones). Although the bands 14 and 16 are shown as being spaced, it is of course understood that they could meet at the center and define a peripheral cutting surface of V-shaped cross section. The particular configuration of the cutting elements or teeth which form the outer cutting periphery are not of particular importance to the present invention; however, when the tool is being used to cut the corners from a hot steel billet the teeth are preferably formed as conventional hot saw teeth with a somewhat gear tooth like cross section.

With the cutting tool assemblage positioned generally in the manner described, a biasing force $F_b$ is applied to the assemblage to move it toward the billet 10. As the assemblage is rotated rapidly about its axis 13 at a relatively high rate (in the range of 18,000 to 24,000 surface feet per minute), and the biasing force $F_b$ applied to move it against the billet, the contact of the cutting periphery with the billet causes the removal of the outer corners of the billet 18 and 20, respectively (shown heavily shaded). As can be readily understood, the actual quantity or depth of cut made in each of the respective corners 18 and 20 depends upon a variety of factors; among which are, the speed of relative movement between the billet and the cutting tool in a direction along the corners, the physical characteristics of the billet (temp., etc.), the biasing force $F_b$ applied, and the speed of rotation of the cutting tool assemblage and its tooth configuration or design. However, for any one installation the relative speed between the billet 10 and the cutting tool assemblage, the rotational speed of the tool assemblage, and its tooth configuration will be constant, as will, the hardness and physical characteristics of the billet. For this reason, the depth of the cut or quantity of material removed from the respective corners is governed substantially solely by the biasing force $F_b$ applied. Consequently, no special depth limiting or regulating mechanisms need to be used.

As previously mentioned, billet 10 is coming from a continuous casting machine. Normally, in such machines the billet is guided to some degree by various guide and straightening rolls, and the withdrawal rolls; however, because the billet is undergoing somewhat nonuniform cooling, thermal stresses are set up in the billet which cause it to shift, at times, from its intended path of movement. This shifting, although not extremely large, is sufficient to make it difficult to closely limit the depth of corner removed. In the present apparatus this shifting is readily followed and the depth of cut maintained substantially constant.

As is apparent, with the subject apparatus the engagement of the cutting peripheries 14 and 16 with the corners of the billet produce reaction forces $F_{r1}$ and $F_{r2}$ which, in the case where the angles of inclination of the cutting faces and the quantity of material being removed from each corner are equal, will also be equal. Forces $F_{r1}$ and $F_{r2}$ have respective vertical and horizontal components $F_{r1v}$, $F_{r2v}$ and $F_{r1h}$, $F_{r2h}$. These components will likewise be normally equal, with $F_{r1v}$ and $F_{r2v}$ being equal in total to be the applied biasing force $F_b$. Now however, assume that the billet 10, through thermal stress or otherwise, shifts away from the cutting tool assemblage and to the right, as shown by dotted lines in FIG. 6. In such case, if the cutting tool assemblage were rigidly mounted only the corner portion indicated by 20' would be removed. However, because the assemblage is under a constant bias toward the billet it continues to move toward the billet until vertical reaction force components are produced which are equal to $F_b$. As can be seen however, if the assemblage were restrained against lateral movement it would continue to move straight in until it reached a position wherein reaction forces $F_{r2v}'$ and $F_{r1v}'$ were produced which are equal in total magnitude to $F_b$. In such case, the amount of material removed from corner 20 would be greatly in excess of the desired (for example as shown crosshatched), whereas none or too little material would be removed from corner 18. In accordance with the present invention, this problem is overcome by permitting the assemblage 12 to have a limited degree of freedom in two directions generally along the axis 13. In the structural embodiment of the present invention, the limited freedom of movement is provided by mounting the cutting tool assemblage so that it can pivot about an axis which extends generally parallel to the path of movement of the billet 10 but is spaced a substantial distance therefrom. This produces a freedom of movement which, over the short distance required, is effectively a straight line as shown at 24 in FIG. 6.

Because the assemblage 12 is permitted to have the noted degrees of freedom, the shifting of the billet to the position shown in dotted lines is quickly followed. Note that if the quantity of material being removed from corner 20 exceeds that being removed from corner 18, the horizontal component $F_{r2h}'$ of the reaction force $F_{r2}'$ is greater than the horizontal reaction force $F_{r1h}'$ of the reaction force $F_{r1}'$ produced by corner 18. Consequently, because of the unbalance of horizontal reaction forces the assemblage moves to the right to a position wherein equally balanced reaction forces are again produced. Although the movement has been described as being inwardly along a straight line and then sidewardly to rebalance it, it should be understood that in operation the assemblage will somewhat shift or slide along the corners to maintain a balanced position.

Although the functioning of the cutting tool assemblage has been explained in operation on a rectangular billet with the cutting peripheral bands 14 and 16 at angles of approximately 45° relative to the plane of rotation, it should be understood that these angles could vary and that the 45° angle is merely preferred because it produces a uniform corner removal. Obviously however, the angle of inclination of the peripheral cutting bands 14 and 16 could be varied and the assemblage would still function in the same manner. Further, if the polygonal configuration of the billet were other than a rectangle, various other angles would tend to produce a more symmetrical corner removal.

As can readily be seen, the use of a tool of the described configuration in the manner noted, allows the corners of the billet to be readily removed uniformly without special controls or adjusting mechanisms. Further, this arrangement allows the cutter to follow, within relative wide limits, shifting and moving of the billet from its intended path of movement, as well as, variations in the billets cross-sectional dimensions.

In addition to the above-noted advantages, the cutter configuration allows a wide variety of billet sizes to be handled without readjustment. Note that the cutting tool shown in FIG. 6 can remove the corners of billets which vary in widths from slightly more than width "$a$" to slightly less than width "$b$". Additionally, larger or smaller billets can be handled simply by varying the spacing between the cutting bands 14 and 16.

Although FIG. 6 and the discussion directed specifically thereto have involved only the removal of two corners of the rectangular billet 10, it is of course understood that by positioning a second cutting tool assemblage on the opposite side of the billet and operating it in the manner described with reference to cutting tool assemblage 12, all four corners of the billet can be simultaneously conditioned.

Figure 1:
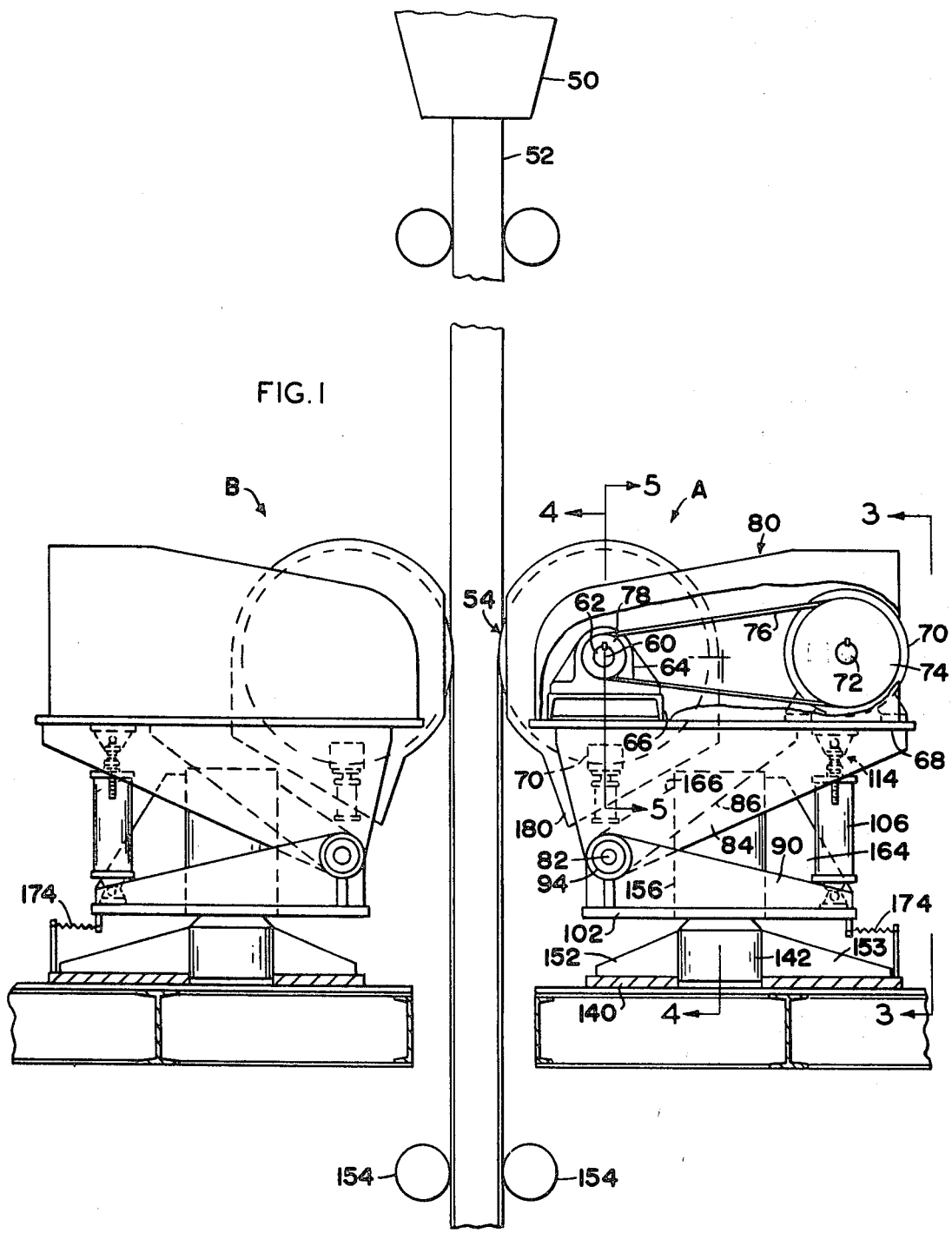
FIG. 1 is a side elevation showing an apparatus of the invention being utilized to condition the corners of a steel strand coming from a continuous casting machine.

As is apparent, a variety of different machines could be utilized for practicing the above-described method. FIGS. 1 through 5 however, show one particular apparatus which is preferred. Referring specifically to FIG. 1, there is shown a conventional water cooled mold 50 of a continuous casting machine. Exiting from the lower end of the mold is a billet 52 of rectangular cross section. The billet is continuously withdrawn from the mold at a substantially constant speed by a pair of withdrawal rolls 154. The speed of withdrawal of the billet from the mold is, of course, governed by the rate of solidification in the mold; however, in most current continuous casting machines this rate is in the range of approximately 100 feet per minute.

Positioned beneath the mold and adjacent the vertically moving billet are two cutting machines A and B arranged and constructed so as to practice the aforedescribed method. The exact location of the machines longitudinally of the path of movement of the strand is not of particular importance; however, in the particular embodiment under consideration, the machines are located on a floor approximately 20' to 25' beneath the outlet of the continuous casting machine. Although only one machine could be used, or two machines of substantially different structural configuration could be provided, in the preferred embodiment the machines A and B are substantially the same and differ only in fact that machine B is a mirror image of machine A. This particular arrangement is preferred, as will become apparent, because in most continuous casting installations a plurality of parallel, relatively closely spaced strands must be conditioned. By constructing the machines in the manner to be described, the machines can be placed close enough together to treat all of the parallel strands.

Because machines A and B are mirror images of one another, only machine A will be described in detail. The description made with regard to machine A is to be understood as equally applicable to machine B.

Figure 2:
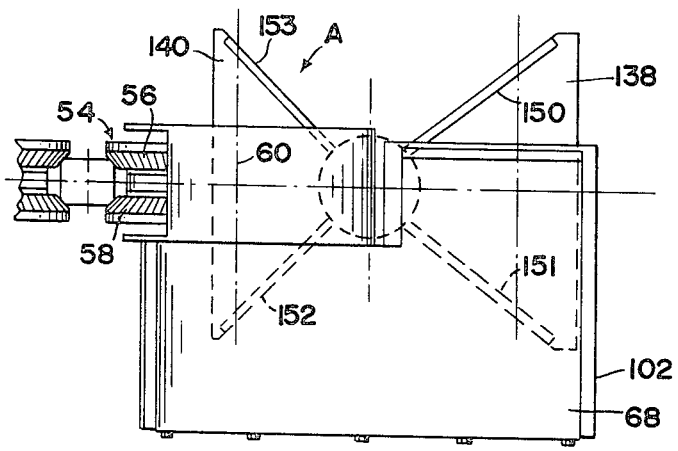
FIG. 2 is a partial plan view of the apparatus of FIG. 1.
Figures 3, 4:
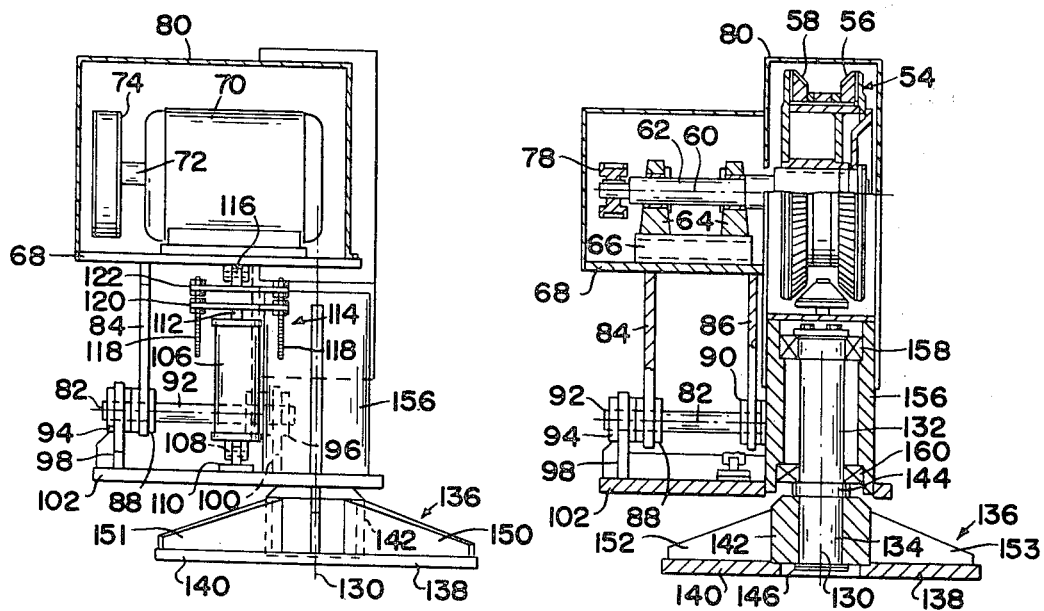
FIG. 3 is a view taken on line 3–3 of FIG. 1.
FIG. 4 is a view taken on line 4–4 of FIG. 1.

As shown, machine A comprises a rotatably mounted cutting tool assemblage 54 which is arranged generally as described with reference to assemblage 12 in FIG. 6. That is, as shown in FIG. 2, the assemblage has an outer cutting periphery defined by two peripherally extending, inclined cutting bands 56 and 58. The details of a preferred construction for the cutting tool assemblage will subsequently be described; however, as shown in FIG. 4, assemblage 54 is mounted for rotation about a horizontally extending axis 60 which is defined by an arbor or spindle 62 carried in suitable bearing blocks 64. Bearing blocks 64 are bolted or otherwise positively connected to a base member 66 which in turn is connected to a first frame defined by a generally horizontally extending plate 68. The means for driving assemblage 54 could be of a variety of types but is shown as a conventional electric motor 70 which is carried by plate 68 and has its output shaft 72 keyed or otherwise positively connected to a pulley 74. Pulley 74 is drivingly connected through a belt 76 with a second smaller diameter pulley 78 which is keyed to spindle 62. Shown positioned around the motor and drive assembly is a sheet metal housing 80.

In order to allow the assemblage 54 to be maintained under a constant predetermined bias toward the billet 52, a first frame defined by plate 68 is mounted for pivotal movement about a horizontally extending axis 82. The plate 68 is welded to a pair of downwardly extending parallel plates 84 and 86. The lower ends of plates 84 and 86 are respectively provided with suitable bearings 88 and 90 which permit the entire first frame and cutting tool assemblage, as well as the drive, to rotate about a horizontally extending shaft 92 which defines axis 82. Shaft 92 is mounted in suitable support members 94 and 96 carried in vertically extending plates 98 and 100 which are welded to a second frame defined by a horizontally extending plate 102.

The means for pivoting the first frame and cutting tool assemblage about axis 82 and for maintaining it under a constant bias toward the billet 52 could take a variety of forms; however, in the particular embodiment under consideration a hydraulic cylinder 106 extends between plates 102 and 68 and serves to perform the biasing function. Specifically, referring to FIG. 3, it is seen that the hydraulic cylinder 106 has its lower end pivotally connected through a pivot pin 108 and a bracket 110 to plate 102. The piston rod 112 of hydraulic cylinder 106 is connected through an adjusting mechanism 114 and a pivot connection 116 with the lower surface of plate 68. The adjusting mechanism 114 is shown as simply a pair of studs 118 which are connected with a plurality of nuts to two parallel extending plates 120 and 122, which are in turn connected respectively to the end of piston rod 112 and pivot connection 116.

In order to allow the cutting tool assemblage 54 to have the desired freedom of movement in the two directions generally along the axis of rotation 60, the entire unit is mounted for pivotal movement about a vertical axis 130 which extends generally parallel to and in the same plane as the billet 52. Referring specifically to FIGS. 3 and 4, it is seen that the axis 130 is defined by a vertically extending shaft 132 which is supported at its lower end 134 in a suitable pedestal or base stand 136. Base stand 136 comprises two generally triangular-shaped plates 138 and 140 which are connected at their apex to a central sleeve member 142 which receives the lower end of shaft 134. Shaft 134 is releasably connected to sleeve 142 by an integral annular collar 144 and a nut 146. The pedestal or base 136 is further rigidified by four generally triangularly shaped reinforcing plates 150 through 153. Plates 150 and 151 are welded to plate 136 and the side of sleeve member 142 whereas, plates 152 and 153 are welded to plate 140 and the opposite side of sleeve 142.

As shown in FIG. 4, the entire machine is arranged for pivotal movement about shaft 132. Specifically, a large diameter sleeve 156 is positioned vertically and connected at its lower end to plate 102. Suitable thrust bearings 158 and 160 are received in the sleeve 156 and support the machine for free rotation about shaft 132.

Sleeve 156 is further connected to plate 102 by triangularly shaped reinforcing plates 164 and 166. As is apparent, when formed in the described manner, the machine allows the assemblage 54 to be maintained under a constant bias toward the vertically moving billet 52. Additionally, the assemblage is free to move in two directions generally along the axis of rotation 60 to thereby follow, within limits, the shifting of the billet from its intended path of movement.

In order to center the machine relative to the intended path of movement of the billet so that the assemblage is centered as it is moved into the billet on start up, the tension spring 174 is connected between the base 136 and the plate 102. Preferably, this spring is only heavy enough to prevent pivoting of the machine (for instance from vibration) about the vertical axis 130 when it is not in contact with the billet, and is not strong enough to materially affect the freedom of movement of the assemblage during operation.

Figure 5:
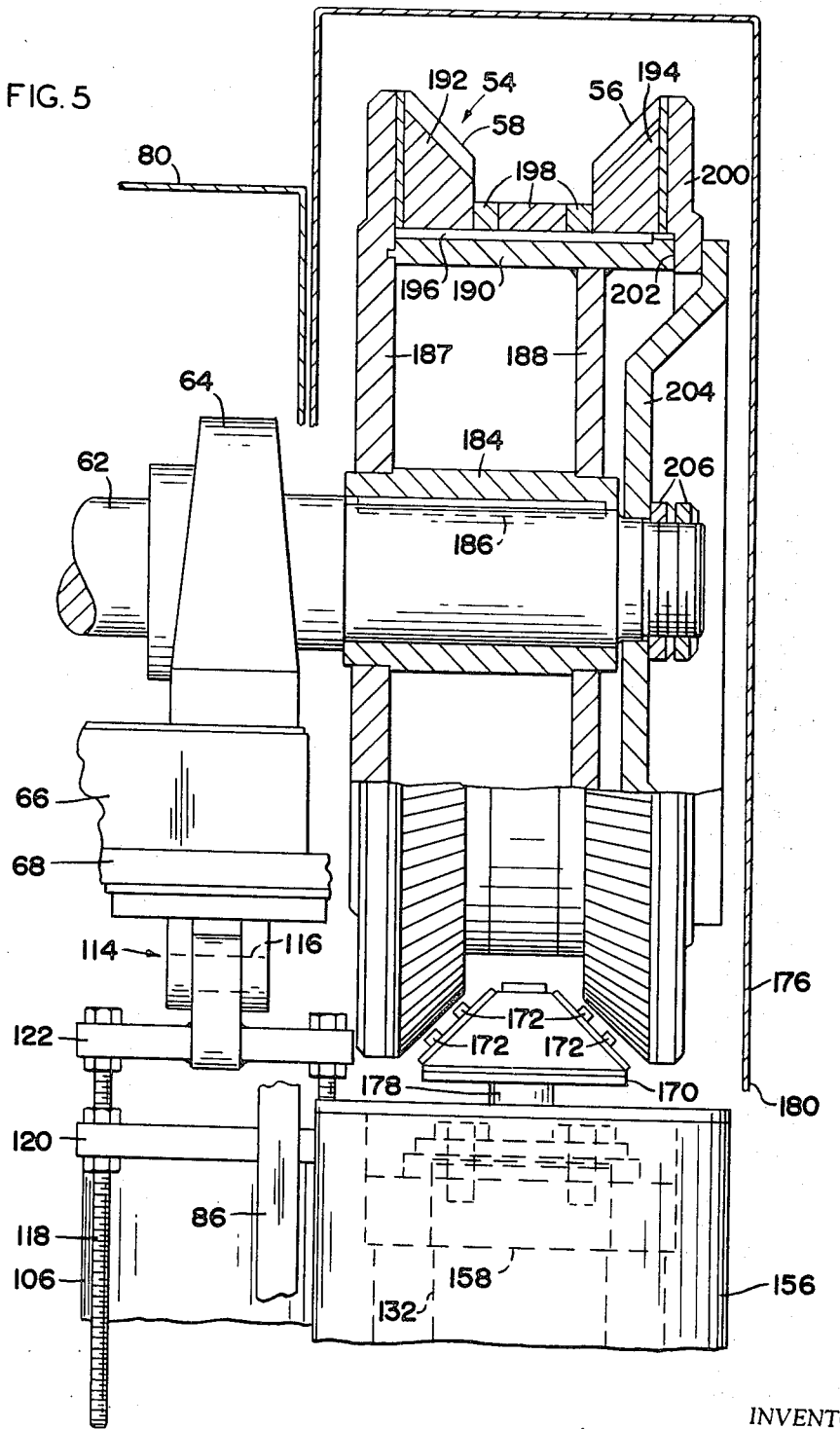
FIG. 5 is a view taken on line 5–5 of FIG. 1.

During the process of metal removal the surface of the cutting members of assemblage 54 is extensively heated by the friction between the billet and the members rotating at high speed (e.g. 18,000—24,000 s.f.p.m.). In addition, the cutting members are also heated by the billet when the machine is used with a continuous casting machine, for example, the billet may be at a temperature of 2,400°F. In order to prevent the cutting members from being overheated, means are provided for directing a cooling fluid against the peripheral cutting bands. Referring to FIG. 5, these means are shown as including a spray nozzle 170 positioned directly beneath the center line of the assemblage. The nozzle is provided with spaced outlet openings 172 which function to direct cooling fluid into engagement with the peripheral band portions 56 and 58. The spray nozzle is supported from the lower surface of a sheet metal housing 176 which surrounds the cutting tool assemblage. Any convenient source of cooling fluid or cooling lubricant can be supplied through the nozzle supply pipe 178.

The cooling fluid and the chips or removed particles of billet material are directed out the lower open portion 180 of the housing 176. Since the chips are not mixed with abrasive dust they can easily be recovered and reprocessed. For example, simply by positioning a receiving trough or conveyor beneath the open end 180 of the housing, the chips can be conveyed away to a collection point.

Although the cutting tool assemblage 54 could be formed in a variety of specific forms, the preferred construction is as shown in FIG. 5. As shown there, the assemblage includes a central sleeve 184 which is arranged to be received on the outer end of spindle 62 and nonrotatably connected thereto by a key 186. A first circular plate member 187 is connected to the left-hand end of the sleeve 184, such as by welding, and extends radially outward. A second smaller diameter cylindrical plate 188 is similarly connected to the right-hand end of sleeve 184. A cylindrical drum member 190 is positioned concentrically with the sleeve 184 and is connected at its inner end to plate 170 and at an outward location to the outer periphery of circular plate 188. The cutting periphery of the assemblage 54 is defined by two annular-shaped ring members 192 and 194 having outer surfaces in the form of truncated cones. The internal diameter of these ring members is sized so as to permit them to be closely received on the outer periphery of drum member 190. A key 196 engages a corresponding groove formed in the outer surface of drum 190 and the inner surface of the members 192 and 194 to prevent relative motion between the rings and the drum.

The spacing between the members 192 and 194 is adjustable by the use of a plurality of circumferentially extending spacer rings 198. The cutter rings and spacers are maintained on the drum during operation by an outer washer or clamp plate 200 which has a radial recess 202 arranged to center it relative to the assembly. A clamping member in the form of a dish shaped plate 204 functions to engage the inner periphery of ring 200 to apply a clamping force to clamp the assembly together. The outer end of spindle 62 is threaded and a pair of nuts 206 serve to releasably maintain the plate 204 on the end of the spindle and apply the necessary clamping forces.

Figure 7:
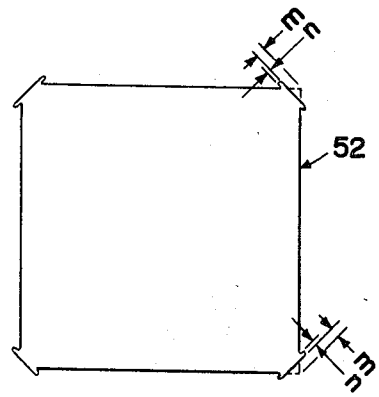
FIG. 7 is an enlarged cross section of one corner of a metal billet showing "fins" which are formed under certain conditions of operation.

The aforedescribed method and apparatus produces, in most instances, proper and satisfactory corner removal; however, during the conditioning or removal of the corners of certain types of metal billets, fins or burrs are sometimes formed such as shown in FIG. 7. The formation of the fins is believed to be dependant upon factors such as the temperature and grade of metal, the depth of cut taken, etc. Although the fins would normally not be a problem, where the billet is subsequently rolled, the fins can adversely affect the quality of the resultant rolled product.

Figure 8:
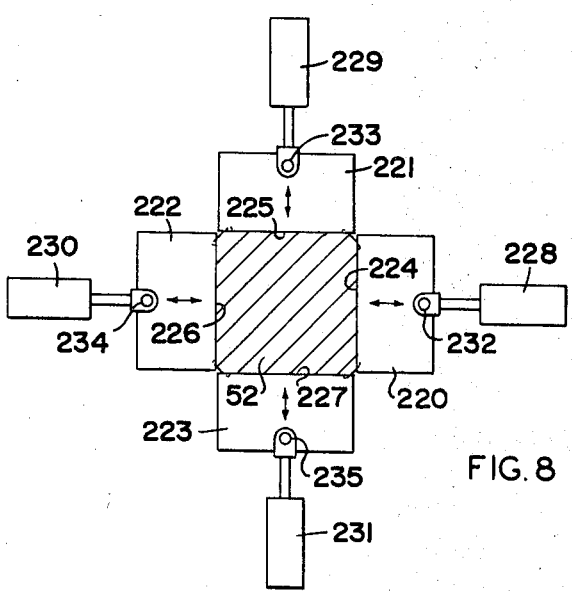
FIG. 8 is a plan view of one form of apparatus useful for removing the "fins" shown in FIG. 7.

A variety of different apparatus and/or methods of operation can be utilized for preventing the formation of the fins, or removing them after they have been formed. One of the simplest methods for removing the fins, is to simply position a blade transverse to the workpiece and break or scrape them off. An apparatus capable of performing this method is shown in FIG. 8. As shown, four knives 220 through 223 are positioned so that their respective cutting edges 224 through 227 are each in engagement with a separate face of the billet 52. The knives are each suitably mounted and guided in any convenient manner, so as to be maintained under a constant, relatively light bias toward the billet. Consequently, as the billet moves past the knives the fins are scraped off. The means used for mounting and guiding the knives could be of a variety of types, but are shown as comprising air cylinders 228 through 231. The cylinders are fixedly supported in any convenient manner by structure not shown, and their piston rods are each pivotally connected by pivot pins 232 through 235 to their respective knife. This permits the knives to follow slight twisting and shifting of the billet. Alternately, instead of providing all of the knives with separate air cylinder mounts, two of the knives, for example, knives 220 and 222, can be mounted from the first frame of machines A and B and biased outwardly by springs.

An additional method by which the fins can be removed is by controlling the movement and biasing of the rotary cutting assemblage. For example, since the formation of the fins is dependant to an extent on the depth of cut taken, by limiting the depth of cut, no fins, or exceedingly small fins, will be formed. In order to limit the depth of cut sufficiently to avoid formation of fins while still removing a quantity of corner material sufficient to eliminate the microcracks, the corners can be removed in what is effectively a plurality of cutting tool passes. Referring to FIG. 7, it is seen that if a first pass is made to a depth "$m$", substantial fins will be produced. If this first pass is then followed by a second pass wherein a cut of depth "$n$" is made, the fins formed on the first pass are removed and no new fins are formed. The actual number of passes made and their respective depth could, of course, be varied. Additionally, the most preferable depth for the last or finishing pass would vary depending upon the thickness of the fins formed on the preceeding pass.

Many different structures could be provided for carrying out this plural pass method. For example, a second rotary cutting assemblage maintained under a lighter biasing force could be positioned immediately following the first assemblage 54 shown in FIG. 1. Alternately, in situations wherein the billet is stationary and the cutting assemblage is moved relative to the billet, a first pass would be made under a substantial biasing force, and a subsequent pass made with a much lighter biasing force.

Figure 10:
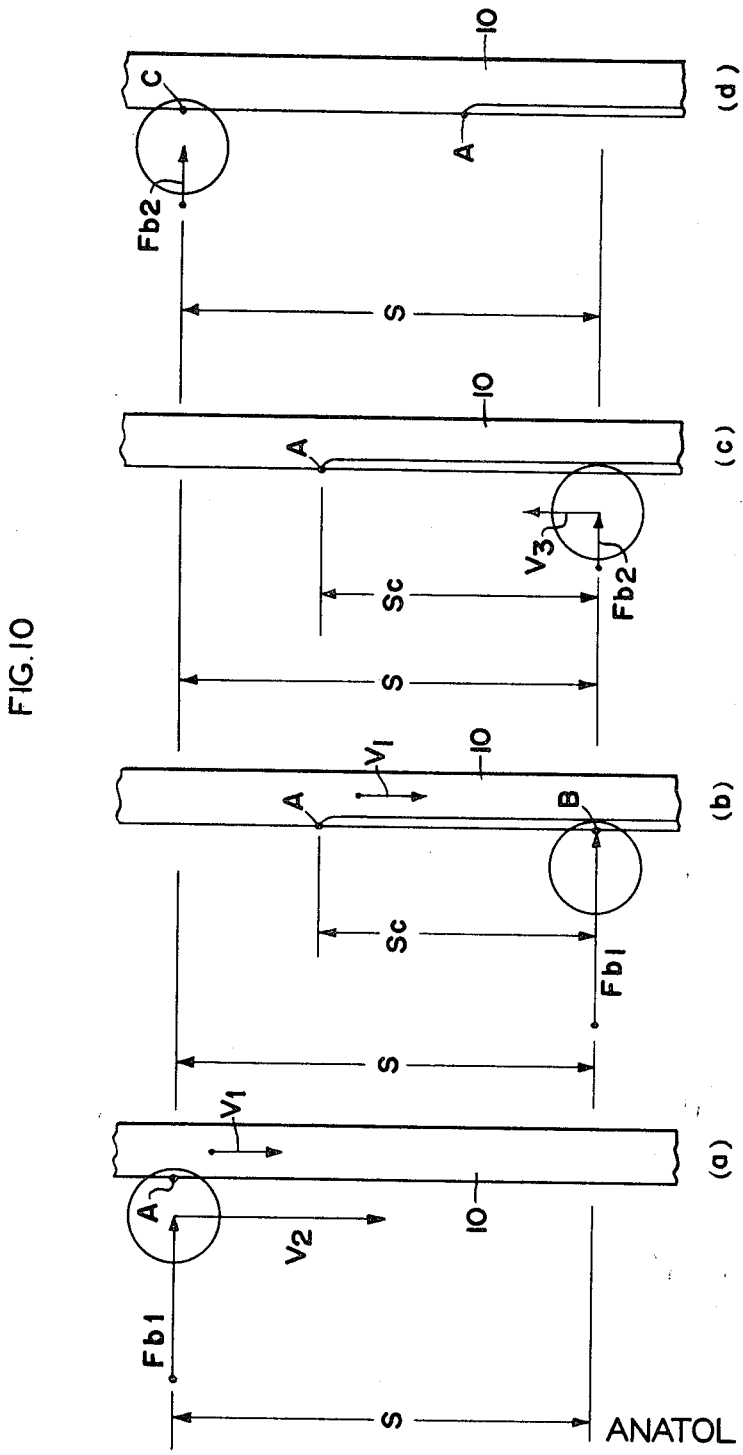
FIG. 10 is a diagram showing the effect of using the modified apparatus of FIG. 9.

The preferred method by which a single cutting assemblage can be utilized to perform the required plural passes on a moving billet, for example, a billet coming from a continuous casting machine, can best be explained by reference to FIG. 10. FIG. 10 shows, somewhat diagrammatically, the relationship between a moving billet 10 and a cutting assemblage 54 at various points in the practice of the method. To explain, assume that in FIG. 10a; the rotating cutting assemblage 54 is under a bias force $Fb_1$ toward point A of the billet and that the billet is moving at a velocity $V_1$ as shown by the arrow. At this time, the assemblage 54 is moved at a velocity $V_2$ (substantially greater than $V_1$) in the same direction as the billet 10 through a distance $s$. Consequently, when the assemblage has reached point B shown in FIG. 10b, it will have made a first cut of length Sc on the billet. At point B the biasing force is reduced to $Fb_2$ as shown in FIG. 10c and the assemblage moved in a direction opposite to the direction of movement of the billet at a velocity $V_3$, (which is preferably also substantially greater than $V_1$). During its movement from the position shown in FIG. 10c to the position shown in FIG. 10(d) the assemblage, because it is under a lesser biasing force, is making a finishing cut of lesser depth which does not produce the undesirable fins. By regulating the velocities $V_2$ and $V_3$ so that their average is 3 times as great as $V_1$, the continual repetition of the aforedescribed sequence produces a uniform corner removal throughout the length of the moving billet. To further explain, after the cutting assembly reaches point C of FIG. 10d the biasing force is again increased to $Fb_1$ and the assemblage moved back down at velocity $V_2$. If the average velocity of the cutter assemblage is 3 times as great as $V_1$ then point A will arrive at lower end of distance $s$ at the same time as cutting assemblage 54, i.e. the cutting assemblage has made three traverses of distance s during the period that point A has made one traverse.

Figure 9:
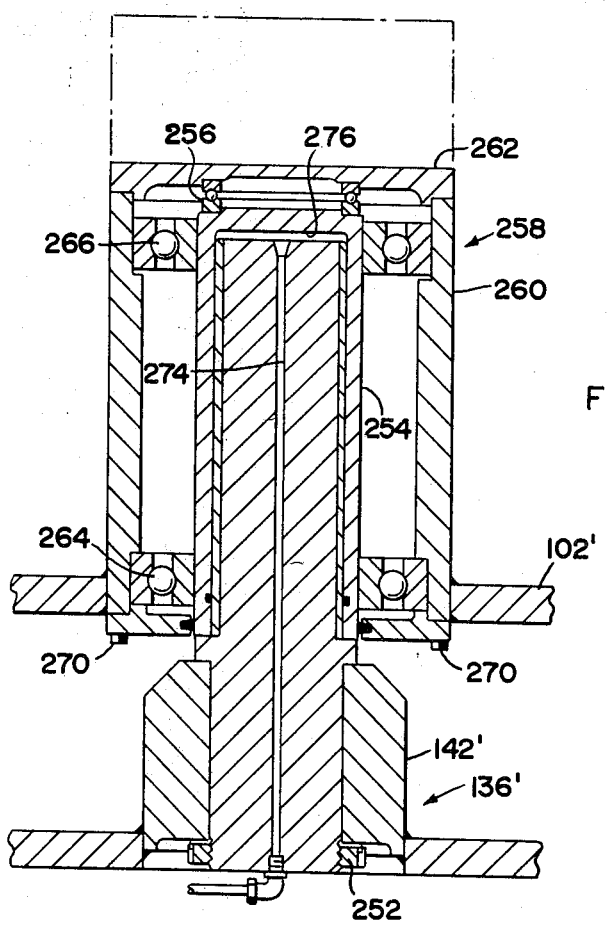
FIG. 9 is a vertical cross-sectional view through a modified base pedestal arrangement for the apparatus of FIGS. 1—5.

Any of a variety of structures could be provided to practice the plural pass method previously described. FIG. 9 shows how the machine of FIGS. 1—5 can be modified to practice the method. All elements of the FIG. 9 structure which are the same as the previously described structure of FIGS. 1—5 are identified with the same reference numeral but differentiated therefrom by the use of a prime suffix. As shown, the modification of FIG. 9 includes a base pedestal 136' which includes base plates 138' and 140' which support a sleeve 142'. A vertically extending piston or pivot member 250 is connected in the central opening of sleeve 142' by a nut 252. A cylinder member 254 is closely received on member 250 and arranged to be freely reciprocable relative thereto. The upper end of cylinder member 254 supports, via a suitable thrust bearing 256, an outer member 258 comprised of a cylinder portion 260 and an end wall 262. Conventional ball bearings 264 and 266 maintain member 258 centered on cylinder member 254, while permitting it to be freely rotatable relative thereto. Bearing 264 is maintained in position by a retainer and seal ring 268 suitably connected to member 260 such as by screws 270.

The entire cutting machine is supported from member 258 by having the second frame, defined by plate 102', connected thereto in any suitable manner. Additionally, as can be seen, by supplying and discharging pressurized fluid through line 274 to chamber 276 the entire machine can be reciprocated vertically. The supply of fluid can be controlled in any suitable manner, but is preferably controlled by conventional valves (not shown) actuated by limit switches positioned at opposite ends of the machine's vertical path of reciprocation.

The control of fluid to the biasing piston 106 is, of course, regulated so as to provide the heavy and light forces required on alternate vertical reciprocations of the machine. This regulation can likewise be accomplished in a variety of ways, but is preferably accomplished by the use of limit switch actuated valves (not shown).

The above-described method and apparatus is, as discussed, especially suited for conditioning the corners of continuously cast billets simultaneously with their casting. As will be apparent to those skilled in the continuous casting art, the overall design and configuration of the preferred embodiment of the apparatus makes it capable of being readily used in multiple strand continuous casting installations. Referring to FIG. 11, a plan view of a six strand casting installation is shown wherein 12 corner conditioners 300 formed in accordance with the present invention are provided for conditioning all four corners of each strand 302. Basically, the conditioners 300 are constructed in the same manner as described with reference to the FIG. 1 embodiment, with one important exception which will subsequently be described in detail. As shown, six of the conditioners 300 are arranged on each side of the row of strands and positioned in closely adjacent side-by-side relationship. The conditioners 300 on each side are preferably identical with all those on the same side but of mirror image relationship relative to those on the opposite side.

Although the machine of the FIG. 1 embodiment could be used in the FIG. 11 layout, because of space limitations and the intense heat produced by the strands, difficulties would be experienced in servicing the individual cutting assemblages and their respective drives without discontinuing casting or moving the entire machine away from the strand. The economics and practicalities of continuous casting make discontinuance of casting for cutter maintenance totally unacceptable. Further, the size and weights of the conditioners, as well as the many hydraulic connections, makes moving the entire machine somewhat undesirable.

In accordance with the present invention an arrangement is provided which permits the cutting assemblage and its drive to be displaced a substantial distance from its cutting or operative position without moving the remainder of the machine. Referring specifically to FIG. 12, the modified machine 300 is shown in detail. In general, the machine is the same as the machine shown in FIG. 1. Consequently, like reference numerals differentiated by prime suffixed will be used to indicate the same elements and the description given with reference to the FIG. 1 element is to be considered applicable unless otherwise noted.

In particular, the machine shown in FIG. 12 differs from the FIG. 1 machine in that the second frame includes first and second relatively movable plate members 304 and 306. Plate member 304 is supported from and pivotally movable relative to the base 136' in the same manner as plate 68 of the FIG. 1 machine. The motor 70' and the cutter assemblage are connected to and supported from the second plate member 306 in the same manner as the corresponding elements are connected to plate 68 in FIG. 1.

In order to permit the cutter assemblage and drive to be moved to a position wherein it can be easily serviced, the plate members 304 and 306 are interconnected so that plate 304 is selectively movable relative to plate 306. As shown in FIG. 12, plate 306 is preferably connected to plate 304 through a bearing assembly 308 having a horizontal pivot axis. This allows the cutter assemblage and drive to be moved from the operative or cutting position shown in dotted lines to unoperative or maintenance position shown in solid lines. Referring again to FIG. 11 it is seen that when the cutter assemblages are moved to the outermost position as shown by the second machine on the left side, they can be easily serviced without interferring with the adjacent corner conditioners. Further, the movement to and from the outermost position can take place without stopping casting at that, or any other, particular station.

As shown in FIGS. 11—13, bearing assembly 308 includes a pair of outwardly extending bracket plates 310 which are welded to the underside of plate 304 and rotatably support a horizontal shaft 312. A second pair of bracket arms 314 are connected to shaft 312, such as by being keyed thereto, so as to be rotatable therewith. The arms 314 are connected to plate 306, and accordingly, rotation of shaft 312 produces rotation of plate 306.

Although, a variety of drive means could be utilized for providing selective rotation, the means preferably comprise a hydraulic cylinder driven gear and rack arrangement best shown in FIGS. 13 and 14. As shown, a spur gear 318 is keyed to the outer end of shaft 312. A rack gear 320 is connected to the piston rod 322 of a hydraulic cylinder 324 carried from plate 304. A guide roller 326 is also supported from plate 304 and maintains the rack 320 in driving engagement with gear 318. Consequently, by selectively supplying hydraulic fluid to cylinder 324 the cutter assemblage and drive can be quickly swung from its working position to the remote position for servicing.

In addition to the previously discussed advantages of the invention, it should be noted that the cutter assemblage can be shifted without disconnecting any hydraulic lines, electrical or water supply lines. Additionally, the arrangement permits an overhead hoist, as shown at 330, to be installed around the unit for use in servicing the units.

The invention has been described in great detail sufficient to enable one of ordinary skill in the art to make and use the same. Obviously, modifications and alterations of the preferred embodiment of the invention will occur to others upon a reading and understanding of the specification and it is my intention to include all such modifications and alterations as part of my invention insofar as they come within the scope of the appended claims.

I claim:
1. In a machine for removing a pair of adjacent corners from an elongated workpiece of polygonal cross section including:
   a circular cutting tool assemblage including first and second cutting members in the form of truncated circular cones with their outer conical surfaces defining cutting bands;
   spindle means for mounting said cutting members for rotation about an axis with their smaller diameter ends in opposed relationship;
   means for rotating said cutting members; and first means for maintaining said cutting members under a predetermined bias in a first direction generally perpendicular to said axis of rotation, the improvement comprising:

frame means for supporting said cutting tool assemblage for selective movement about a horizontal axis between a working position and a position remote therefrom, said frame means including first and second relatively movable frame members, said first frame members supporting said tool assemblage and said means for rotating, and said second frame member being pivotally connected to said first frame member and supporting said first means.

2. The improvement as defined in claim 1 wherein said first frame member is connected to said second frame member by a horizontally extending shaft and power means are provided for selectively rotating said shaft.

3. The improvement as defined in claim 1 including selectively actuable power means connected between said first and second frame members.

4. The improvement as defined in claim 1 including power means for rotating said first frame member.

5. In combination, a continuous casting machine for producing a substantial vertically moving billet, a cutting machine for removing the corners of said billet including a rotary cutter means positioned with its axis of rotation extending horizontally and power actuated frame means for supporting said cutter means for selective movement about a horizontal axis parallel with said axis of rotation to move said cutter means between a working position wherein said cutter means engages said vertically moving billet and a nonworking position wherein said cutter means is spaced from said billet a distance substantially twice the distance between said billet and the horizontal axis of said frame means.

6. The combination as defined in claim 5 wherein said frame means includes first and second members each mounted for movement about a vertical axis and interconnected by hinge means which permit said second member to be pivoted relative to said first member about a horizontal axis.

7. The combination as defined in claim 5 further including motor means carried by said frame means for driving said cutter means.

8. The combination as defined in claim 7 wherein said motor means is movable with said cutter means during movement between said working position and said nonworking position.